March 9, 1948. J. R. ALBERS 2,437,659
BALANCED IMPELLER STRUCTURE FOR WIND MOTORS
Filed July 19, 1943 4 Sheets-Sheet 1

INVENTOR
JOHN R. ALBERS
BY David M. Davis
HIS ATTORNEY

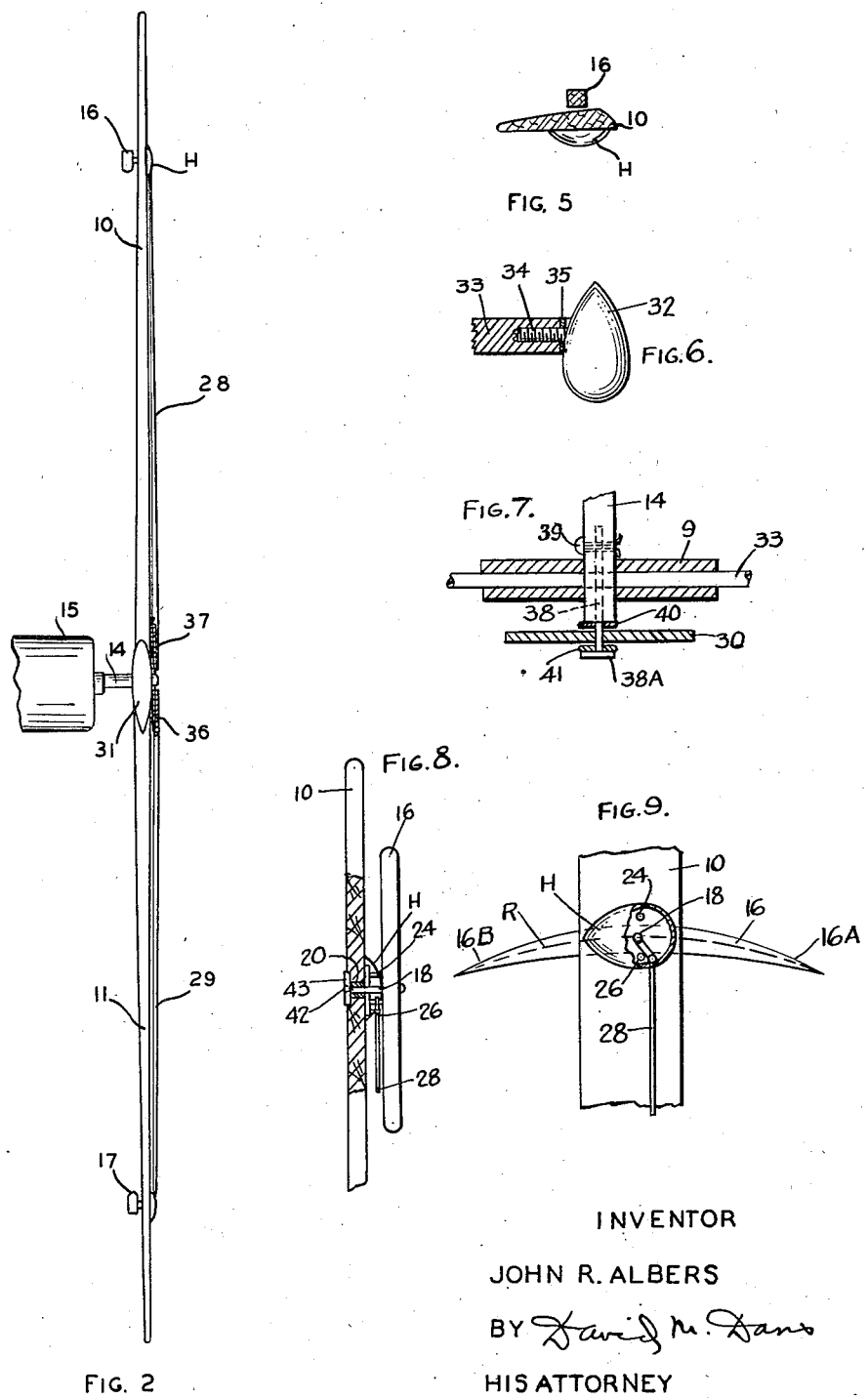

March 9, 1948.  J. R. ALBERS  2,437,659

BALANCED IMPELLER STRUCTURE FOR WIND MOTORS

Filed July 19, 1943   4 Sheets-Sheet 3

INVENTOR
JOHN R ALBERS
BY
HIS ATTORNEY

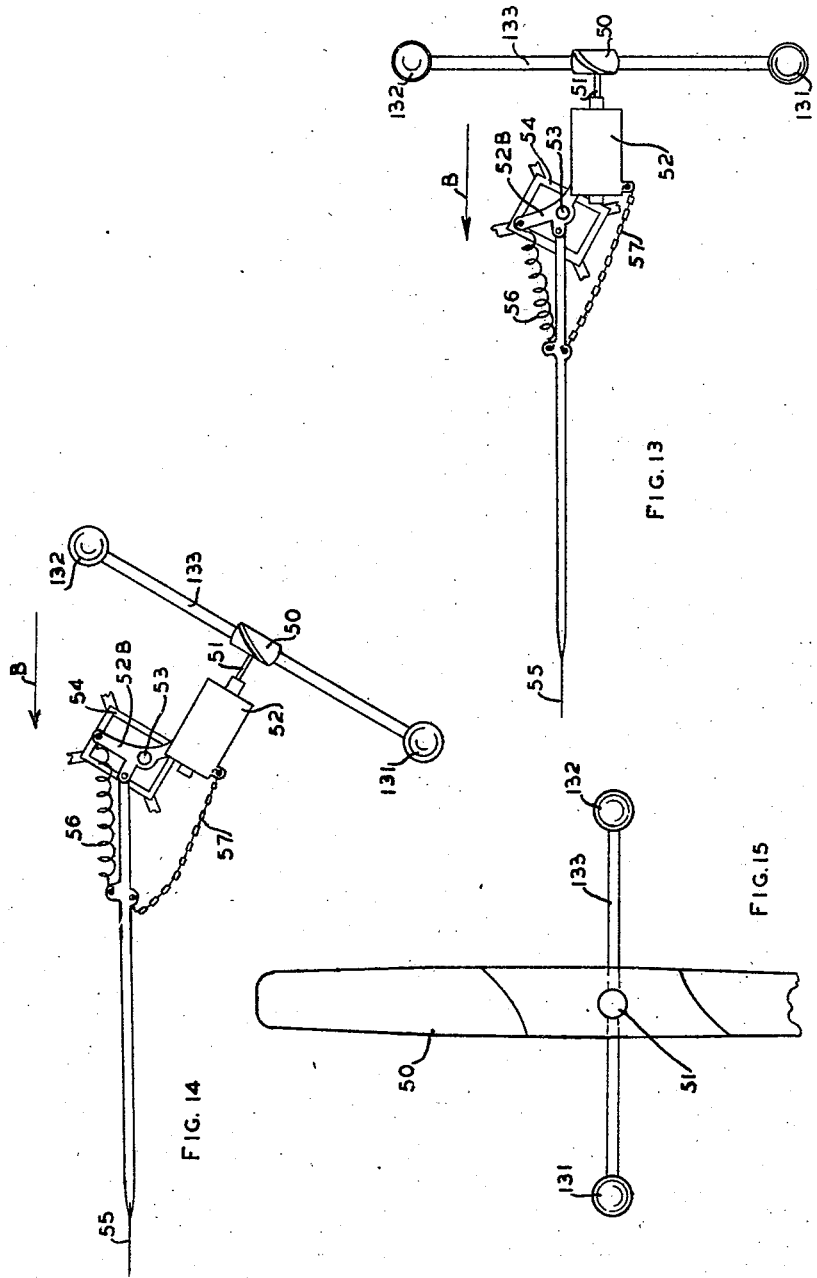

Patented Mar. 9, 1948

2,437,659

UNITED STATES PATENT OFFICE 2,437,659

BALANCED IMPELLER STRUCTURE FOR WIND MOTORS

John R. Albers, Sioux City, Iowa, assignor to Wincharger Corporation, a corporation of Minnesota Application July 19, 1943, Serial No. 495,261

3 Claims. (Cl. 170—75)

This invention relates to wind motors and more particularly to means for balancing the impeller structure of such motors.

Modern wind motors, particularly in the smaller sizes, operate at very high speeds. At such high speeds, the disturbance in the wind stream produced by one blade of the wind motor impeller may not have been carried past the impeller before the next blade turns into the disturbance and this is one of the factors limiting the maximum speed attainable. For this reason, small high speed impellers usually have but two blades and are therefor quite unbalanced gyroscopically, that is, they are subject to rapidly varying forces when while rotating about the impeller axis the direction of the axis is changed. Such change in the direction of the axis of the impeller occurs whenever the direction of the wind changes, wind motors being commonly provided with tailvanes to cause them to present their plane of rotation perpendicular to the wind.

It is common practice to provide a wind motor with an aerodynamic governing mechanism of some sort. For example, it is known to provide a wind motor with a governing airfoil pivotally mounted on the windward face of the impeller blade with the airfoil arranged to be moved into governing position by centrifugal force acting against a spring biasing the airfoil into non-governing position. The governing airfoil in governing position deflects air outwardly from the tip of the impeller blade. It has also been proposed to mount a governing device on the leeward side of an impeller blade of a wind motor. In both of the arrangements described above the addition of the governing mechanism to the impeller blades increases the mass of the blades and hence increases their gyroscopic unbalance.

There has also been used a wind motor in which the governing airfoils are mounted on separate arms at right angles to the impeller blades. This arrangement serves to decrease the gyroscopic unbalance but has the defect that the long arms necessary to mount the governing airfoils in operative position must be of considerable strength and size and consequently cause a substantial drag unless specially designed. Furthermore, such separate arms increase the total cost of the wind motor.

According to the present invention the governing airfoils are mounted on the impeller blades themselves, thus avoiding the use of separate arms, and gyroscopic balance is attained by additional means.

Some of the prior art wind motors have not depended on the use of governing airfoils for speed regulation, but instead have made use of the so-called "side-governing" principle according to which the whole impeller structure is rotated so that the plane of rotation of the impeller blades is no longer perpendicular to the direction of the wind. While such an arrangement does not increase the gyroscopic unbalance of the motor, it increases the importance of gyroscopic balance since every time the side governor operates the direction of the impeller axis is changed. According to another aspect of my invention means are provided for gyroscopically balancing such a side governing motor.

In order to balance a rotating body gyroscopically, it is necessary to cause a homogeneous mass distribution about the axis of rotation. This can be accomplished to a certain degree in the case of a two bladed impeller by adding balancing weights on the ends of a cross arm mounted on the impeller axis at right angles to the line of the impeller blades. While theoretically it may not be necessary that the weights be in the same plane of rotation as the impeller blades, in actual practice because the impeller shaft can bend in between the plane of the weights and the plane of the blades, it is desirable that the weights be placed in the plane of impeller rotation or at least be supported on arms connected to the same part of the impeller shaft as the impeller blades. Otherwise, despite the balanced or homogeneous distribution of the masses when projected onto a plane perpendicular to the axis of rotation, vibrations would be set up whenever the direction of the axis of rotation was shifted due to bending of the impeller shaft as the gyroscopic forces on it varied at points along its length.

For similar reasons it is desirable to mount any governing apparatus on the impeller blades in such a manner as to cause equal distribution of mass on the windward and leeward sides. This is necessary to avoid creation of gyroscopic moments tending to bend the impeller blades when the axis of rotation is changed in direction.

It is seen therefore that to achieve practical gyroscopic balance it is necessary to balance the mass distribution of the impeller structure in three dimensions and accordingly, it is an object of this invention to provide an impeller balanced in three dimensions.

Another object of this invention is to provide a new and improved governor or spoiler which may be attached to the leeward surface or windward surface of a wind driven impeller blade which is operated in part by centrifugal forces and which is provided with means for synchronously deflecting the spoilers or governors uniformly.

The features of my invention which I believe to be novel are set forth with particularity in the appended claims. My invention itself, both as to its organization and manner of operation, together with further objects and advantages thereof, may best be understood by reference to the following description taken in connection with the accompanying drawings in which:

Fig. 2 is a side view of the structure illustrated in Fig. 1;

Fig. 5 is a view taken substantially on line 5—5 of Fig. 1 when the member 16 is in the position shown dotted in Fig. 1;

Fig. 6 is a fragmentary view, partly in section, of a portion of the apparatus shown in Fig. 1;

Fig. 7 is a sectional view taken substantially on lines 7—7 of Fig. 1;

Fig. 8 is a fragmentary view, partly in section, of a modified structure embodying my invention;

Fig. 9 is a fragmentary view of another modified structure embodying my invention;

Fig. 13 is a plan view of a further apparatus embodying my invention;

Fig. 14 is a plan view of the apparatus shown in Fig. 13 in another operative position;

Fig. 15 is a front view of a position of the impeller structure shown in Fig. 13.

Figure 1:
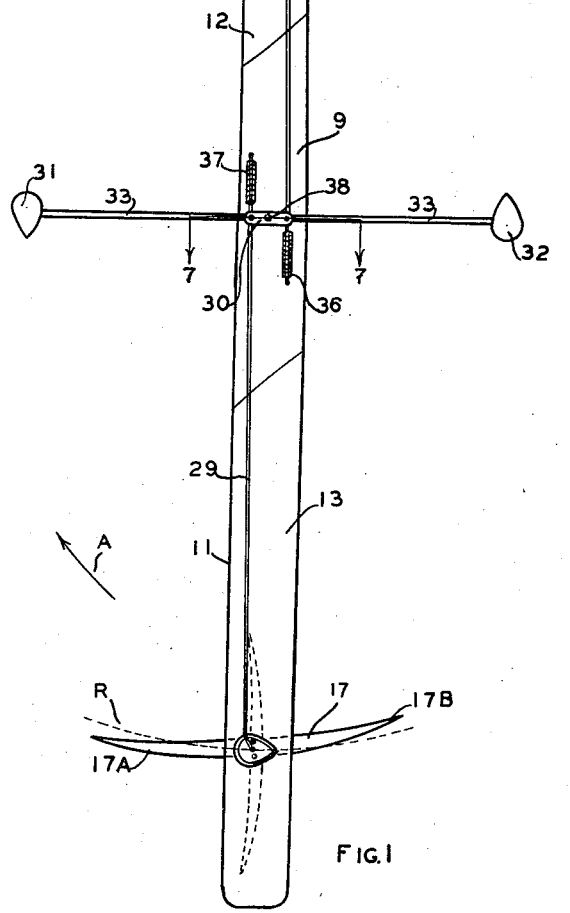
Figure 1 is a front view of apparatus embodying my invention.

The wind driven impeller shown in Fig. 1 comprises a hub 9 and a pair of blades 10 and 11 which are usually formed from a single piece of material. The windward sides of the blade shown in Fig. 1 present beveled sides 12 and 13 to the wind for rotation of the composite impeller about its center of gravity which corresponds to the axis of a rotatable shaft 14 (Fig. 2).

The impeller is fastened to the rotatable shaft 14 by means to be described later. Shaft 14 may be rigidly connected to a mechanical or electrical device for transforming rotational energy produced by rotation of the wind driven impeller into mechanical or electrical energy. That is, shaft 14 may be connected to a mechanical device such as a water pump or to an electrical device such as a generator 15 arranged to be driven by the impeller.

Due to the characteristics of the impeller surfaces 12 and 13, the impeller shown in Fig. 1 rotates in the direction of the arrow A when wind blows in a direction perpendicular to the plane of the drawing and toward beveled sides 12 and 13.

Spoilers or governors 16 and 17 mounted respectively on the leeward faces of each one of the impeller blades 10 and 11 for relative movement thereon may move to assume the position shown dotted in Fig. 1 under certain conditions of impeller rotation. One of the important features of this invention is that the spoilers or governors 16 and 17 are operated synchronously and cannot operate independently of one another. The particular means for causing the spoilers 16 and 17 to operate synchronously are preferably located so that the composite impeller including the spoilers or governors and actuating mechanism therefor produce no unbalance when and as the spoilers or governors are moved. For this reason, among others, the actuating mechanism for spoilers or governors 16 and 17 is mounted symmetrically about the center of gravity of the impeller in such a manner that change in moments due to movement of spoiler or governor 16 with respect to blade 12 is exactly compensated by the change due to movement of spoiler or governor 17 with respect to blade 11.

Figure 4:
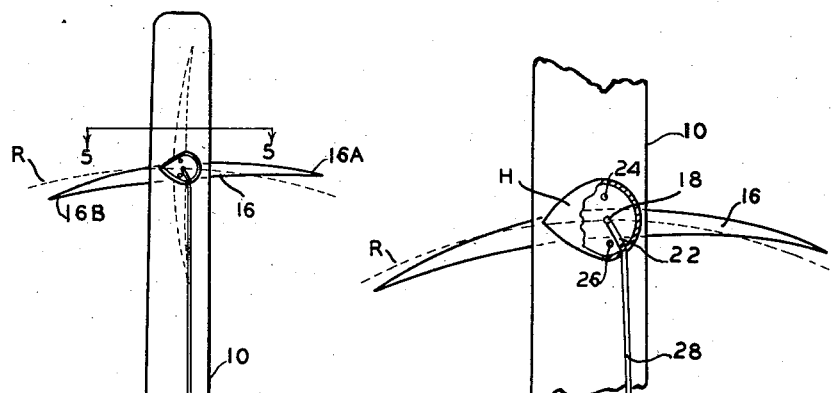
Figs. 3 and 4 are fragmentary views, partly in section, showing certain parts of the structure illustrated in Figs. 1 and 2.
Figure 3:
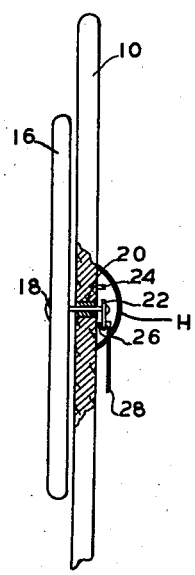

Figs. 3 and 4 illustrate the particular manner in which spoiler 16 is mounted on its corresponding blade 10. Spoiler 17 is mounted on blade 11 in the same manner. The spoiler or governor 16 is securely fixed to shaft 18 which is rotatably mounted in bearing member 20 in impeller 10. Bearing member 20 is rigidly held in impeller blade 10 in a press fit therein. Arm 22 securely mounted on shaft 18 is free to move within the angular distance determined by stops 24 and 26 which may consist of pegs press fitted into impeller blade 10. The end of arm 22 removed from shaft 18 is rotatably connected to restoring or controlling rod 28, for instance, by inserting a bent end of restoring rod 28 as shown in Fig. 3 through an enlarged hole in arm 22 and then enlarging the end of the rod. Other means may be used for mounting the spoilers or governors 16 and 17 on the impeller and my invention is not necessarily limited to the particular means disclosed. Other means may be used to achieve an important feature of my invention wherein the control or restoring rods 28 and 29 are actuated in response to movement of the spoilers or governors 16 and 17, respectively, and vice versa.

The spoilers or governors 16 and 17 are shaped and spaced relative to the blades 10 and 11 so as to present a streamlined surface when the impeller rotates about its axis at speeds below the governing speed. As shown in Fig. 9, each spoiler or governor 16 and 17 is substantially a crescent shaped blade and when in non-governing position is so disposed relative to its corresponding impeller blade that the mean radius of each spoiler or governor blade corresponds to a radius R drawn through the tips or leading and trailing edges of the blade with the axis of impeller rotation as a center. For smoother operation, in some instances each spoiler or governor crescent shaped blade may be skewed a small angular distance with respect to an arc drawn through the center of rotation of the spoiler or governor blade with the axis of impeller rotation as a center. For instance, the spoiler or governor blades may be skewed as shown in Figs. 1 and 4 and the degree of skewing, at speeds below governing speed, is determined by the position of stop 26 (Fig. 4) with respect to arm 22.

Control or restoring rods 28 and 29 serve as rigid links for transferring movement of spoilers or governors 16 and 17 to the common rotatably mounted equalizing bar 30 and vice versa. Also, as hereinafter explained, the weight of the rods 28 and 29 contribute to the operation of the governing mechanism. The control or supporting rods 28 and 29 each have an end thereof fastened to opposite ends of the equalizing bar 30. The control or restoring rods 28 and 29 may be pivotally mounted at the respective ends of the equalizer bar 30 whereby motion of the equalizing bar 30 causes corresponding equal movement of rods 28 and 29. The equalizing bar 30 is rotatably mounted at its center of gravity which corresponds to the axis of rotation of the impeller.

Tension springs 36 and 37, having one end fastened to the impeller and the other end fastened to the equalizing bar 30, maintain a positive pull on the control or restoring rods 28 and 29 so as to maintain positively the spoilers or governors 16 and 17 in a position wherein clockwise movement of the governors 16 and 17 is arrested by the inner stop members corresponding to stop 26 in Fig. 4. Not only do the tension springs 36 and 37 cause positive biasing forces on control rods 28 and 29, but since they act through the intermediate equalizing bar 30 equal movements are imparted to the spoiler or governing mechanism which is symmetrically mounted about the center of rotation of the impeller.

As illustrative of the manner in which the elements heretofore described may be mounted about the center of rotation of the impeller, the construction shown in detail in Fig. 7 is now described. The energy transmitting shaft 14 extends through the impeller hub 9 and has a radial hole therethrough for the passage of supporting member 33 and has an axial hole therethrough for the reception of a shaft 38 which is securely mounted to the energy transmitting shaft 14 by means, for instance, of a modified cotter pin 39. Equalizing bar 30 is rotatably mounted on shaft 38 having head 38A which includes the equalizing bar 30 between antifriction means, for instance, washers 40 and 41 which are on shaft 38. The impeller hub 9 has a hole therethrough for the passage of supporting member 33 which also passes through shaft 14 and thus prevents movement of impeller hub 9 along the axis of shaft 14. Supporting member 33 has a radial hole therethrough for the passage of shaft 38 and thus member 33 may not move relative to impeller hub 9.

Figure 11:
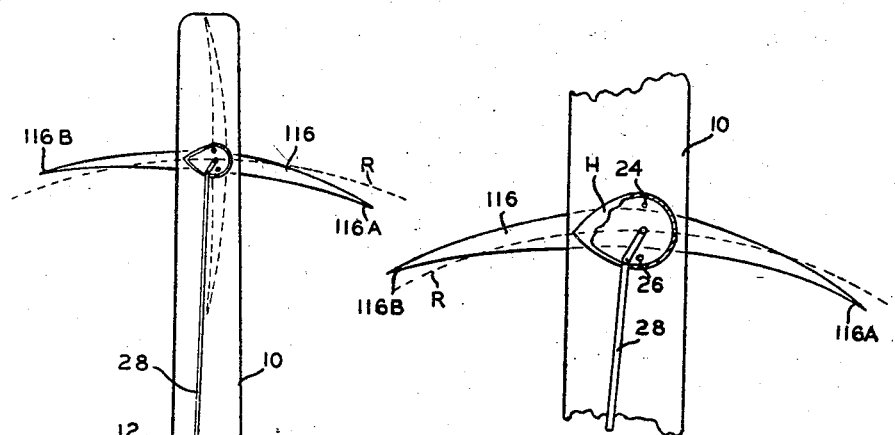
Fig. 11 is a fragmentary view, partly in section, showing certain parts of the structure illustrated in Fig. 10.
Figure 12:
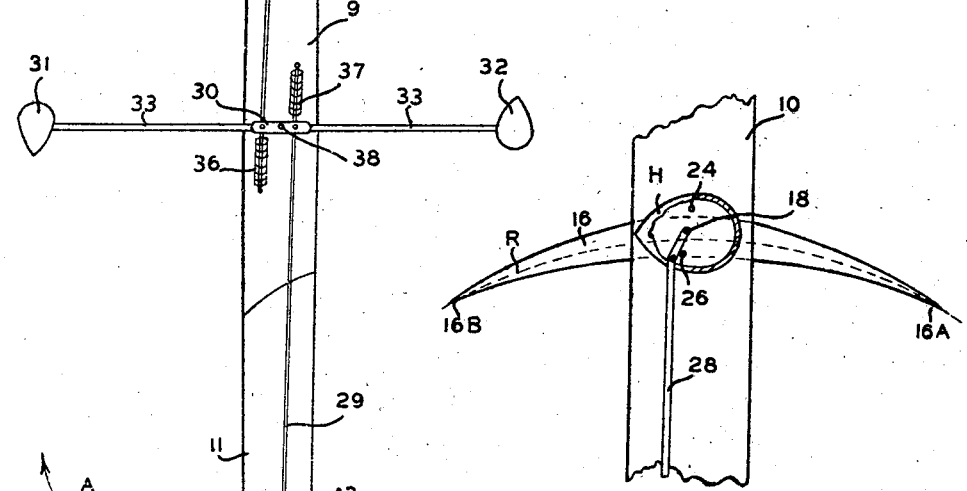
Fig. 12 is a fragmentary view, partly in section, of another apparatus embodying my invention.

With the apparatus thus far described, rotation of the impeller structure, including the blades 10 and 11 and the spoilers or governors 16 and 17, causes two types of force to be present which tend to turn the spoilers or governors 16 and 17 from the full line position illustrated in Fig. 1 to a position approaching the dotted line position. One of these forces is centrifugal in nature, and arises primarily by reason of the tendency of the two rods 28 and 29 and attached members to move radially and outwardly during rotation of the impeller structure. These centrifugal forces may also be caused to arise in part by suitably forming and pivoting the spoilers or governors 16 and 17. For example, as shown in Fig. 12 the pivoting point of the spoilers or governors corresponding to the axis of shaft 18 may be displaced radially outwardly off the arc corresponding to radius R, and as soon as the spoilers or governors 16 and 17 are thrown out of the non-governing position the centrifugal forces on the spoilers or governors will be balanced and will tend to throw them further in the same direction as they were initially moved. Also, as shown in Fig. 11, the pivoting point may be displaced tangentially from the center of the spoilers or governors 116 and 117 so that they are initially unbalanced in a direction tending to move them to governing position.

The other force tending to move the spoilers or governors arises from wind pressure, and acts by reason of the fact that the spoilers or governors 16 and 17 (Fig. 1) are skewed a small angular distance from arc R in the non-governing position and hence rest at a small angle of attack to the air as they rotate with the impeller structure. That is, in the non-governing position the leading edges 16A and 17A of the governors 16 and 17 lie further from the rotating center of the impeller structure than do the trailing edges 16B and 17B of those plates. Consequently, air passing the spoilers or governors 16 and 17 presses the leading edge portions 16A and 17A outwardly as measured from the rotating center of the impeller structure.

When the spoilers 16 and 17 are skewed a small angular distance as shown in Fig. 1, there may also be an unbalanced component of centrifugal force which tends to cause the spoilers to move to a position approaching the dotted line position, for since some elemental parts of the spoilers or governors are displaced a greater distance from the center of rotation of the impeller structure than other elemental parts, the first mentioned elemental parts have greater centrifugal forces acting thereon to urge them further from the center of impeller rotation, and provided the spoiler or governor is properly shaped, the moment arms on which the first mentioned parts act about the pivotal axis will not be reduced sufficiently to compensate for this unbalance.

Thus, these two forces, namely those arising from centrifugal action of the rods 28 and 29 and movable parts attached thereto and wind forces operating on the spoilers or governors 16 and 17, increase gradually from zero as the impeller structure rotates in the direction of the arrow A (Fig. 1) faster and faster from a point of rest. At a certain speed the total forces tending to turn the spoilers or governors 16 and 17 become equal to the force of springs 36 and 37 tending to maintain the spoilers or governors in their normal ineffective position, and as the centrifugal wind forces increase a slight amount more they overcome slightly the opposing force of springs 36 and 37 and turn the spoilers or governors 16 and 17 out further to a position approaching the dotted position. It is necessary always that the rate of increase of forces tending to turn governors 16 and 17 upon displacement of those governors shall be less than the corresponding spring rate of springs 36 and 37.

When the spoilers or governors 16 and 17 are turned from their initial position, they not only do more work on the air than in their initial position, but also spoil the streamlined surfaces of the blades 10 and 11 so that the net wind pressure driving the blades 10 and 11 is decreased. As a result, the rate of increase of speed of rotation of the impeller blades 10 and 11 upon increase in wind speed above the speed at which the spoilers or governors 16 and 17 turn upon increasing wind velocity is much less than at lower speed rotation.

It is to be noted that the spoiler or governer blades are disposed relatively close to the impeller blade so that in effect turbulence near the spoiler plate is directly at the impeller blades. The size of the spoilers or governers 16 and 17 in relation to the tension of the springs 36 and 37 is such as to maintain the impeller desirably close to a certain maximum speed.

I have thus far shown the spoilers or governors 16 and 17 mounted on the leeward side of the impeller. The governors or spoilers 16 and 17 may be mounted on the front side or windward side as shown in Fig. 8. In Figs. 3 and 8, like parts are given identical reference numerals. In the arrangement shown in Fig. 8 the shaft 18 rigidly secured to spoiler plate 16 is rotatably mounted in the bearing 20 which is held in impeller 12 by press fitting or the like. Shaft 18 may be removed from the propeller blade 12 by removing screw 42 which holds the shaft 18 to a circular ring 43. Circular ring 43 is recessed in the impeller blade so as to retain shaft 18 in bearing 20 and maintain a streamlined surface of the impeller blade 12. Housing H, of streamline configuration, serves to enclose a portion of the operating mechanism and offers small air resistance.

Figure 10:
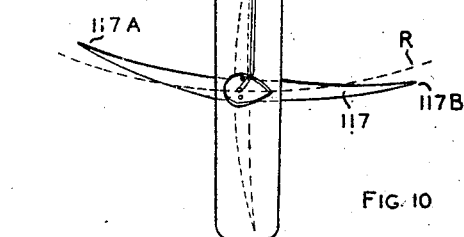
Fig. 10 is a front view of other apparatus embodying my invention.

With the arrangement so far described, spoilers or governors 16 and 17 when deflected from their normal positions cause deflection of the air inwardly toward the center of the impeller structure. In the modifications shown in Figs. 10 and 11, spoilers or governors 116 and 117 are mounted so as to cause air to be deflected outwardly as measured from the center of rotation of the impeller structure. In the modification shown in Figs. 10 and 11, the spoilers or governors 116 and 117 are mounted on the lee side or airfoil side of the impeller blades but the spoilers or governors 116 and 117 may be mounted on the windward or front side of the impeller blade by means of the construction shown in Fig. 8. In Figs. 10 and 11, parts similar to those already described are given identical reference numerals. Except as stated above, the operation is the same as for the arrangement shown in Fig. 1.

In each of the above described arrangements it is imperative that the impeller structure be gyroscopically balanced. To this end the elements comprising the composite impeller are symmetrically mounted about the axis of rotation and in addition cross balancing means (Figs. 1 and 10) are mounted on the impeller. These cross balancing means comprise the rain drop shaped members 31 and 32 which are mounted on a supporting rod 33 fastened to hub 9 at the center of rotation of the impeller. The members 31 and 32 (Fig. 6) are preferably of rain drop shape so as to present a streamlined surface when the impeller rotates in the direction of the arrow shown in Fig. 1. The member 32 is adjustably mounted on rod 33 by means of a screw connection 34 therebetween. In order that a better balance may be obtained, provision may be incorporated in the structure whereby the spacing of members 31 and 32 relative to the impeller may be varied. For instance, spacers 35 of various thickness may be disposed between the members 31 and 32 and their supporting rods 33, or the length of rods 33 may be otherwise adjusted. In order to avoid bending of the impeller blades due to gyroscopic forces, the rods 28 and 29, equalizer bar 30, springs 36 and 37, governors 16, 17, 116 and 117 are proportioned not only to give suitable operating characteristics to the impeller, but also to provide weight for balancing the impeller structure. In order to achieve this last balance it may be desirable to dispose the rods 28 and 29 and their corresponding spoilers or governors on opposite sides of the impeller blade as shown, for instance, in Fig. 3.

Another important feature residing in the use of the weighted members 31 and 32 is that they not only provide a balancing arrangement which prevents large vibrational stresses, but at the same time provide additional momentum to the blade structure after it has started its rotation without materially increasing the drag, thereby smoothing out speed changes due to sudden changes in wind velocity without materially increasing the wind velocity needed to start the impellers rotating initially.

Normally, without any balancing arrangement to prevent the vibrational and various other stresses imparted to the blades 10 and 11, there is a vibratory effect imparted to the blades, due to the pressure of the wind thereagainst as well as buffets imparted by gusts of wind which do not impart equal forces to the impeller blades in all of their positions.

Moreover, a rotating two-bladed impeller, due to relative changes in the direction of centrifugal and gravitational forces acting thereon, has varying amounts of resultant forces acting on the various components thereof during one revolution with the result that in effect unbalanced forces are produced. The streamlined weights 31 and 32 not only provide means for balancing the two blade impeller about an axis corresponding to the axis of rotation of the impeller, but also may provide a balance for the rotational tendency about an axis corresponding to the axis of supporting rod 33. Other advantages of this structure are that a four bladed effect is obtained without the extra expense necessary in providing an extra pair of cross blades.

Preferably, the weighted members 31 and 32 and supporting rod 33 are so positioned and have such mass that the moment of inertia about an axis passing through the axis of rod 33 is substantially equal to the moment of inertia about an axis passing through the longitudinal axis of the impeller blade, and is substantially equal to the moment of inertia about any axis in the plane of the drawing in Fig. 1 intermediate the axis of rod 33 and axis of impeller 10. In that case the composite impeller structure under dynamic conditions behaves as a wheel or disc rotating about its center of gravity and does not "shudder" when the composite impeller structure turns with the wind in a direction perpendicular to the axis of shaft 14. It is understood that the composite impeller structures shown in Figs. 1 to 12 in conventional manner have a tailvane attached thereto and are pivotally mounted for rotation on a tower whereby the axis of impeller rotation is always in the direction of the wind.

The balancing means heretofore described in conjunction with an impeller having governing means rotatably mounted with the impeller may be used equally well in an arrangement wherein the speed of an impeller is controlled by "side governing" as shown in Figs. 13 and 14.

Figs. 13 and 14 show the position of an impeller in a normal low velocity wind and its position in a relatively high velocity wind, respectively. The impeller 50 is directly connected to shaft 51 of a power converting unit such as generator 52 which is pivotally mounted on spindle 53 on a tower 54. Tail vane 55 is pivotally connected to generator housing extension 52B and tension spring 56 connected therebetween biases the impeller structure to a position wherein the rotating axis of impeller 50 and tail vane 55 are parallel to one another when winds of low velocity impinge on the impeller structure. Flexible means or chain 57 for limiting movement of the impeller structure due to the action of tension spring 56 is connected between tail vane 55 and the housing of generator 52 and is taut when the relative positions of the tail vane 55 and impeller structure are as shown in Fig. 13.

When winds above a predetermined velocity impinge upon impeller 50 the composite impeller structure turns on spindle 53 and assumes position such as shown in Fig. 14 wherein a reduced component of wind velocity effects rotation of impeller 50. In other words, the speed of rotation of impeller 50 is controlled automatically by displacing the axis of shaft 51 in a degree depending upon wind velocity.

Therefore, the axis of the impeller structure changes in direction in accordance with wind intensity; and, in winds of varying intensity, large unbalanced forces act on the impeller structure when the impeller structure is unbalanced. These unbalanced forces, in the case of a two-bladed impeller, no longer prevail when the impeller structure includes balancing means comprising rod 133 and weighted members 131 and 132 which are preferably disposed with the axis of rod 133 extending perpendicular to the axis of impeller 50 and in the plane of impeller rotation.

The particular balancing means shown in Figs. 13, 14 and 15 may be attached to rotatable shaft 51 in the same manner as rod 33 is fastened to impeller hub 9 and rotatable shaft 14 in Fig. 7. That is, rod 133 may pass through a radial hole in the impeller hub and rotatable shaft 51 and be fastened therein whereby the balancing means is symmetrically located about an axis defining the center of gravity of the impeller structure.

While I have shown and described the particular embodiments of my invention, it will be obvious to those skilled in the art that changes and modifications may be made without departing from my invention in its broader aspects, and I, therefore, aim in the appended claims to cover all such changes and modifications as fall within the true spirit and scope of my invention.

I claim:

1. A wind motor comprising a two bladed impeller mounted on a shaft at right angles thereto and adapted to rotate with the shaft about the longitudinal axis of the shaft, said blades being mounted in line with each other on opposite sides of the shaft, bearing means for said shaft supporting it for rotation about its longitudinal axis, a governing member attached to each impeller blade on one face thereof, an operating mechanism for said member attached to each impeller blade on the face thereof opposite to said member, said operating mechanisms holding said governing members in inoperative position at speeds of rotation of the impeller below a predetermined speed and causing said governing members to move gradually into increasingly operative positions on increase in the speed above said predetermined speed, said governing members serving when in operative position to reduce the rate of increase of speed of the impeller upon increase in wind velocity, a pair of supporting arms mounted in line with each other on opposite sides of the impeller shaft and in a line at right angles to the line of the impeller blades and perpendicular to the axis of the impeller shaft, and a balance weight attached to the extremity of each of said arms, said weights being streamlined for the direction of rotation of said impeller with which they rotate, said weights being adjustably mounted on the ends of said arms, said adjustment when operated serving to change the length of the moment arms of said weights about the axis of said shaft, the structure comprising said impeller blades and attached governing members and operating mechanisms and balance weights having their masses so distributed that the moment of inertia of said structure about the longitudinal axis of said supporting arms is substantially equal to the moment of inertia of said structure about the longitudinal axis of said impeller passing through the axis of said impeller shaft and that the masses of said structure on the windward and leeward sides of a plane passing through said longitudinal axes of the supporting arms and impeller blades are substantially equal.

2. A two bladed impeller, a speed governing airfoil spoiler mounted on each of the blades, an operating mechanism for each of said spoilers attached to each blade on the face thereof opposite to said spoiler and extending to a point near the axis of rotation of said impeller, said mechanism including at least one spring near said axis arranged to hold said mechanism and spoilers in inoperative position at speeds of rotation of the impeller below a predetermined speed, and said mechanism being arranged to overcome the force of said spring above said predetermined speed to move said spoilers gradually into increasingly operative positions on increase in speed above said predetermined speed, weighted members connected to the impeller and disposed along an axis substantially perpendicular to the impeller blade length and substantially in the plane of rotation of the impeller blades, each of said airfoil spoilers being located near the tips of the respective blade to provide maximum turbulence, said weighted members being located relatively close to the center of the impeller to provide minimum turbulence, said weighted members and airfoil spoilers having such a weight distribution that the composite impeller structure is substantially balanced in three dimensions and the moments of inertia about axes longitudinal and transverse of the impeller are substantially equal.

3. In combination, a wind driven impeller mounted for rotation about an axis, said impeller having blades, an airfoil spoiler mounted on each of said blades for spoiling the airstream adjacent thereto in response to rotational speeds of said impeller above a predetermined speed, an operating mechanism for each of said spoilers attached to the respective blade on the face thereof opposite to said spoiler and extending to a point near the axis of rotation of said impeller, said mechanism including at least one spring near said axis arranged to hold said mechanism and spoilers in inoperative position at speeds of rotation of the impeller below said predetermined speed, and said mechanism being arranged to overcome the force of said spring above said predetermined speed to move said spoilers gradually into increasingly operative positions in response to increase in rotational speed of said impeller above said predetermined speed, whereby tendency of the rotational speed of said impeller to increase above said predetermined speed is reduced, said spoilers being located near the tip of the blades to produce maximum turbulence, said impeller and spoilers and the associated mechanism having such a mass distribution that the moment of inertia thereof is substantially unequal about perpendicular axes lying in the plane of rotation of the impeller, and masses connected with said impeller for rotation therewith and lying on an axis of smaller moment thereby to increase the mass thereof in such direction and in such amount that the moment of inertia of said impeller together with said spoilers and associated mechanism and said masses is substantially equal about said perpendicular axes lying in the plane of rotation of said impeller, said masses being located relatively close to the center of the impeller to avoid undesired spoilage of the air stream.

JOHN R. ALBERS.

(References on following page)

REFERENCES CITED

The following references are of record in the file of this patent:

UNITED STATES PATENTS

| Number | Name | Date |
|---|---|---|
| 1,465,174 | Porter | Aug. 14, 1923 |
| 1,485,788 | Lamwers | Mar. 4, 1924 |
| 1,519,866 | Marchetti | Dec. 16, 1924 |
| 1,537,401 | Blumschein | May 12, 1925 |
| 1,698,709 | Bucklen | Jan. 15, 1929 |
| 1,746,991 | Bucklen | Feb. 11, 1930 |
| 1,924,461 | Schanke | Aug. 29, 1933 |
| 2,037,528 | Miller | Apr. 14, 1936 |
| 2,058,500 | Plucker | Oct. 27, 1936 |
| 2,126,202 | McColly | Aug. 9, 1938 |
| 2,148,921 | Allen | Feb. 28, 1939 |
| 2,277,011 | Albers et al. | Mar. 17, 1942 |
| 2,339,624 | Davis | Jan. 18, 1944 |

FOREIGN PATENTS

| Number | Country | Date |
|---|---|---|
| 21,384 | Great Britain | Sept. 19, 1912 |
| 582,626 | France | Oct. 17, 1924 |
| 588,392 | Germany | Nov. 21, 1933 |
| 639,882 | France | July 2, 1928 |
| 672,424 | Germany | Mar. 2, 1939 |